(12) United States Patent  
Riedel-Kruse

(10) Patent No.: US 8,529,326 B2
(45) Date of Patent: Sep. 10, 2013

(54) GAMES HAVING BIOTECHNOLOGICAL CONTENT

(75) Inventor: Hans Ingmar Riedel-Kruse, Palo Alto, CA (US)

(73) Assignee: California Institute of Technology, Pasadena, CA (US)

(*) Notice: Subject to any disclaimer, the term of this patent is extended or adjusted under 35 U.S.C. 154(b) by 263 days.

(21) Appl. No.: 12/911,296

(22) Filed: Oct. 25, 2010

(65) Prior Publication Data

US 2011/0165540 A1 Jul. 7, 2011

Related U.S. Application Data

(60) Provisional application No. 61/254,504, filed on Oct. 23, 2009.

(51) Int. Cl.
*A63F 9/24* (2006.01)
(52) U.S. Cl.
USPC .............................. 463/1; 434/273
(58) Field of Classification Search
USPC .............................. 434/276; 463/1
See application file for complete search history.

(56) References Cited

U.S. PATENT DOCUMENTS 4,429,373 A * 1/1984 Fletcher et al. ............... 422/403

* cited by examiner

*Primary Examiner* — Corbett B Coburn
(74) *Attorney, Agent, or Firm* — Milstein Zhang & Wu LLC; Joseph B. Milstein

(57) ABSTRACT

Systems and methods for use in playing biotic games having a biologically active material as a component. Various games that provide for one or more human players to interact with biologically active materials are disclosed. The game apparatus includes a replaceable cartridge having a chamber in which a biologically active component such as a single-celled organism or a biologically active compound is contained. A stimulus controller accepts instructions from a human user and provides a stimulus to the biologically active component. A response receiver accepts a signal indicative of a response of the biologically active component. A display is provided to display to the user information indicative of the response of the biologically active component, and a game score. A computer-based game controller includes a set of pre-defined rules of play that define a game and that comprise pre-defined rules of scoring for the game.

17 Claims, 17 Drawing Sheets

| 1 | CX 1x | | 7 | CZ 8x |
| 2 | CZ 1x | | 8 | BX 8x |
| 3 | AZ 2x | | 9 | CX 16x |
| 4 | CX 2x | | 10 | BZ 16x |
| 5 | BY 4x | | 11 | CZ 32x |
| 6 | AY 4x | | 12 | CZ 32x |

FIG. 12

Correct classification of smell
(5 individuals; n=50)

| Task | % Smell success |
|---|---|
| 0+0 vs. 0+G | 80 *** |
| R+0 vs. R+G | 66 ** |

| ROUND # | 1 | 2 | 3 | 4 | 5 | 6 | 7 | 8 | % SMELL SUCCESS 75/85 |
|---|---|---|---|---|---|---|---|---|---|
| CHOICE (A/B) | G R | G O | O O | G R | O R | G O | G O | O R | |
| GUESS BASED ON SMELL (A/B) | O R | G O | O O | G R | O R | G R | O O | O R | |
| OUTGROWTH AFTER 48 h |  |  | |  |  |  |  |  | |
| SCORE (A/B) | 2 2 | 0 3 | 1 1 | 2 2 | 3 0 | 0 3 | 0 3 | 3 0 | TOTAL SCORE 11 14 |

GAMES HAVING BIOTECHNOLOGICAL CONTENT

CROSS-REFERENCE TO RELATED APPLICATIONS

This application claims priority to and the benefit of co-pending U.S. provisional patent application Ser. No. 61/254,504, filed Oct. 23, 2009, which application is incorporated herein by reference in its entirety.

FIELD OF THE INVENTION

The invention relates to games in general and particularly to games that have biotechnological content that affects the game play or outcome.

BACKGROUND OF THE INVENTION

One of the first electronic games, 'Tic-Tac-Toe', was implemented in 1952 on an early vacuum-tube based computer with the goal of demonstrating and studying human-computer interactions. A bioengineered version of the 'Tic-Tac-Toe' was developed in 2003 as paradigm for deoxyribozyme-based computation. Arguably the first true video game, thereby creating a novel game mechanism, was 'Tennis-for-two' on an oscilloscope in 1958, which entertained visitors of the Brookhaven National Laboratory. It took nearly two more decades until video games rose to culturally significant phenomena in the 1970's in the developed world via arcade machines, video consoles, and microcomputers.

There is a need for games based on biotechnology.

SUMMARY OF THE INVENTION

According to one aspect, the invention features a game apparatus. The game apparatus comprises a replaceable cartridge having a chamber having one dimension not greater than one centimeter, the chamber configured to contain a biologically active component, the chamber having at least one input port configured to allow a stimulus to be applied to the biologically active component, and at least one output port configured to provide a signal indicative of a response of the biologically active component; a stimulus controller in communication with the at least one input port of the chamber, the stimulus controller configured to accept an instruction from a user and in response to the instruction to provide the stimulus to the biologically active component; a response receiver in communication with the at least one output port of the chamber, the response receiver configured to accept the signal indicative of the response of the biologically active component and configured to generate at least one signal suitable for display to a user; a display in communication with the data receiver, the display configured to display to the user information indicative of the response of the biologically active component; and a computer-based game controller, the computer-based game controller comprising a set of pre-defined rules of play that define a game and that comprise pre-defined rules of scoring for the game.

In one embodiment, the chamber comprises a microfluidic chamber.

In another embodiment, the biologically active component is a live single-celled organism.

In yet another embodiment, the biologically active component comprises dead tissue.

In still another embodiment, the biologically active component is a ribonucleic acid.

In a further embodiment, the biologically active component is a protein.

In yet a further embodiment, the biologically active component is an enzyme.

In an additional embodiment, the stimulus to be applied to the biologically active component is a chemical stimulus.

In one more embodiment, the stimulus to be applied to the biologically active component is an electrical stimulus.

In still a further embodiment, the stimulus to be applied to the biologically active component is a mechanical stimulus.

In one embodiment, the stimulus to be applied to the biologically active component is a optical stimulus.

In another embodiment, the stimulus to be applied to the biologically active component is a thermal stimulus.

In yet another embodiment, the stimulus controller is configured to apply the stimulus to the biologically active component in accordance with pre-defined rules of a game.

In still another embodiment, the response receiver is configured to analyze the signal indicative of the response of the biologically active component in accordance with the pre-defined rules of a game.

In a further embodiment, the information indicative of the response of the biologically active component includes scoring information for a user.

In yet a further embodiment, the user is situated remotely from the microfluidic chamber.

According to another aspect, the invention relates to a method of playing a game. The method comprises the steps of providing a game apparatus comprising a replaceable cartridge having a chamber containing a biologically active component; receiving an instruction from a user; applying a stimulus to the biologically active component according to pre-defined rules of a game; sensing a response of the biologically active component to the stimulus; analyzing in a computer-based game controller according to pre-defined rules of the game the response of the biologically active component to obtain a result; and performing at least one of recording the result, transmitting the result to a data handling system, or to displaying the result to the user.

In another embodiment the cartridge and/or microfluidic chamber may be non-replaceable, i.e., fixed to the apparatus.

In one embodiment, the result includes scoring information.

In another embodiment, the game is configured to allow play by a plurality of users.

In yet another embodiment, the game apparatus and the user communicate by way of a packet-based communication system.

In still another embodiment, the user is permitted to play the game under a subscription agreement with a sponsor of the game.

According to another aspect, the invention relates to a kit of materials for playing a game, comprising one or more of chemicals and biologically active materials configured to be used in playing the game.

In one embodiment, the kit of materials further comprises a replaceable cartridge configured to be used in playing the game.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIGS. 3-9 show biotic action games that can be realized by controlling single-celled paramecia via electric fields or chemicals.

FIG. 3 shows a paramecium in the inset and its typical run-and-tumble track with frequent changes in swimming direction, denoted by the numerals 1 through 9.

FIG. 4 shows a biotic game console.

FIG. 5 shows an image of paramecia streamed to a computer screen with the virtual game environment superimposed.

FIG. 6 shows a fluid chamber containing paramecia.

FIG. 7 shows a 'biotic processor' including a webcam, electrodes connected to a game controller, and a fluid chamber.

FIG. 8 shows an alternate game apparatus where a human player can influence the behavior or actions of paramecia by releasing chemicals from a micro-needle. The player also controls the position of the needle.

FIGS. 10-13 illustrate the molecular logic game 'Polymer-Race' which has as a goal to predict the speed of DNA amplification given specific PCR (polymerase chain reaction) primer pairings.

FIG. 10 is a schematic representation for the binding positions of forward and reverse PCR primers (A, B, C, and X, Y, Z, respectively) on a DNA template. Selection of a primer pair (such as C and X, i.e., RXN 3), leads to a specific DNA amplification product during PCR.

FIG. 11 illustrates how an amount of amplification product increases with each PCR cycle and can be monitored in real time. The time to reach threshold depends on initial DNA template concentration (RXNs 1 vs. 2; 8× indicates a 8 fold dilution relative to maximal amount), and efficiency of primer combination (RXNs 1 vs. 3). If the forward and reverse primer are in the wrong order (as illustrated in RXN 4), no DNA is amplified. Relative arrangement of primers as in FIG. 10.

FIG. 12 illustrates a pseudo-random set of 12 primer pairs generated from the set in FIG. 10 with systematically lower starting template concentration.

FIG. 13 illustrates an example game played using the set from FIG. 12. Two players continuously monitor PCR results (upper panel), i.e. the 'race', and place bets in real time (middle panel). Bets specify a cycle that the chosen reaction will reach or has reached threshold (for example player B on RXNs 7 and 6, respectively). Players also specify the order of the six primers along the DNA template, i.e., BYCZAX and CZAYBX for player A and B (compare to FIG. 10). Bets are scored after the race (lower panel) and player B wins.

FIG. 14 shows a yeast colony grown from a mixture of two yeast strains expressing red (RFP) or green (GFP) fluorescent protein, respectively.

FIG. 15 shows the game setup illustrating the two tubes that each player has: One tube containing one of the colored yeast strains diluted into buffer, the other tube with buffer only; pay-off matrix as determined after mixing samples from each player and outgrowth over 48 hours.

FIG. 16 illustrates the olfactory classification success for players on whether opponent has cooperated or defected depending on players own actions, i.e., (0 vs. 0+G) or (R+0 vs. R+G) if player defected or cooperated himself, respectively.

FIG. 17 illustrates an example game played over eight rounds displaying the choices each player made, the guesses about the opponents actions based on the perceived smell, the results after colony outgrowth, and eventually the score.

DETAILED DESCRIPTION

For the purposes of this disclosure, we will define the term "biologically active component" to mean a component having biological activity, comprising one or more chemical substances, including substances that together are not sufficient to constitute an entire biological cell, and also a component comprising at least one live single-cell organism, such as a bacterium, an algae cell, and a plankton cell in a medium supporting the at least one live single-cell organism. Formerly living material now fixed or killed are included in this discussion. Use of multi-cellular organisms and tissues are also possible. Non-organic chemicals are also understood to be contained in this definition.

For the purposes of this disclosure, we will define the term "game" to mean an activity having at least one human participant and employing a biologically active component as defined above, the activity engaged in for such purposes as learning, diversion, amusement, or competition, in which the behavior or response of the biologically active component plays a role in the outcome of the activity, with the conduct of the activity having pre-defined rules. For the purposes of this application, the term "game" explicitly does not include card games, board games, games that can be played with paper and pencil, and physical games in which two or more humans compete physically with each other.

Figure 1:
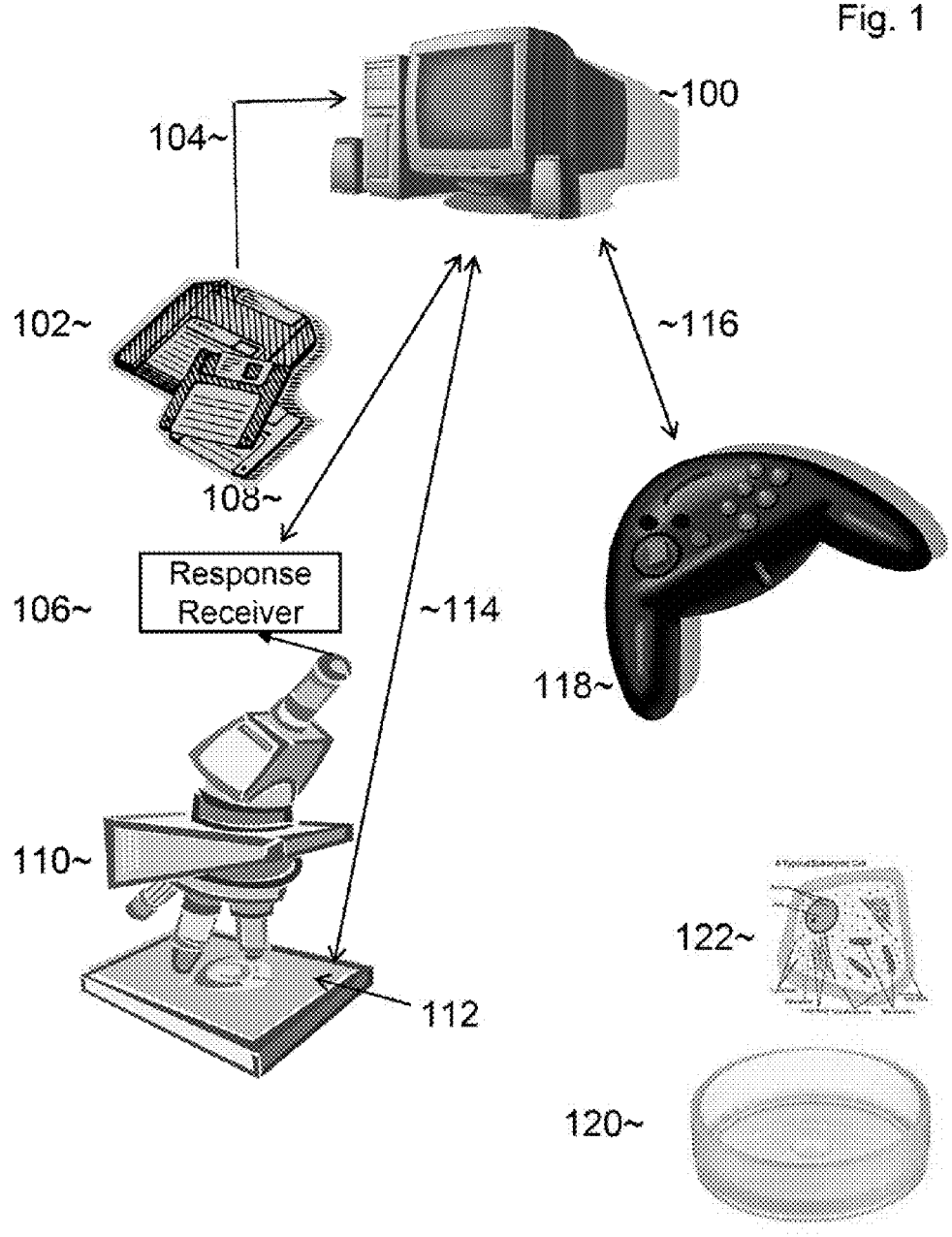
FIG. 1 shows an illustrative schematic diagram in which the components of a game apparatus and their interrelations are presented.

Turning to FIG. 1, there is shown an illustrative schematic diagram in which the components of a game apparatus and their interrelations are presented. A computer-based controller 100 is provided, such as a general purpose programmable computer that can be programmed with instructions recorded in a non-volatile manner on a machine-readable medium 102 such as a magnetic disk. The instructions can be communicated from the machine-readable medium 102 to the computer-based controller 100, for example as illustrated by arrow 104, which can denote that the machine-readable medium 102 is physically connected to the computer-based controller 100, or is in electronic communication with the computer-based controller 100.

When operating on the computer-based controller 100, the instructions recorded in non-volatile fashion on the machine-readable medium 102 define the rules of a game, and can be used to determine a score of each of one or more human participants in the game, hereinafter referred to as one or more players of the game. The score can be determined during the course of the play of the game, and/or can be determined upon completion of the game. A score can be recorded and can be used at a later time for comparison with a score of the same player at a later time, or can be used at a later time for comparison with a score of a different player.

The computer-based controller 100 can receive instructions or commands from a user, who can issue such instructions or commands using a device such as a game controller 118, which communicates uni-directionally or bi-directionally as indicated by bi-directional arrow 116 with the computer-based controller 100. In another realization the game controller 118 could also directly interact with the apparatus 110 or the replaceable cartridge 112 instead of signaling via the computer-based controller 100.

The user can be situated proximate to the game apparatus, or can be remote from the game apparatus and connected to the game apparatus using a packet-based communication system such as the Internet. The delay between the users input into the game controller 112 and the eventual stimulus relayed to the biologically active component 122 can be near instantaneous, i.e., only limited by the physical means of communication, or can be significantly delayed, for example multiple days or weeks, and in such a case the users input can also be stored in meantime.

The computer-based controller 100 can include a display. If a player is proximate to the computer-based controller 100, the display can be used to show the user the progress of the game. If the user is remote from the computer-based controller 100, the information to be displayed can be communicated to a display proximate to the user's location. In particular, either display can be configured to display to the user information indicative of a response of a biologically active component used in the game.

In FIG. 1, there is shown an apparatus 110 that is used to house the biologically active component used in the game. For example, the apparatus 110 can be a microscope. The apparatus 110 can hold a replaceable cartridge 112 having a chamber having one dimension not greater than one centimeter, such as a Petri dish 120 or a microfluidic device, such as an array of chambers on a card. The chamber or chambers are configured to contain a biologically active component, such as paramecia or other organisms 122. The chamber or chambers have at least one input port configured to allow a stimulus to be applied to the biologically active component, and at least one output port configured to provide a signal indicative of a response of the biologically active component. For example, the input port can be an opening (e.g., the cover of the Petri dish can be removed) or a transparent wall, or the opening can be configured to allow an electrical stimulus, a mechanical or physical stimulus, a chemical stimulus, an audio stimulus, a thermal stimulus, and/or an optical stimulus to be applied to the biologically active component. The output of the chamber can be an optical signal, an electrical signal or a chemical signal that can be sensed outside the chamber. In FIG. 1, the output is an optical signal that can be sensed at the eyepiece of the microscope.

The computer-based controller 100 includes a stimulus controller in communication with the at least one input port of said chamber, as illustrated by arrow 112. The stimulus controller is configured to accept an instruction from a user and in response to the instruction to provide said stimulus to the biologically active component, according to pre-defined rules of the game.

There is a response receiver 106 in communication with the at least one output port of the chamber. In FIG. 1, the response receiver 106 can be an electronic detector such as a CCD camera or a CMOS array that can receive an optical response or signal. In another embodiment the response receiver 106 can be an eye of a human observer, who may or may not be a player of the game. The response receiver 106 is configured to accept a signal indicative of a response of a biologically active component and is configured to generate at least one signal suitable for display to a user. The generation of the signal suitable for display to a user can involve communication between the response receiver 106 and the computer-based controller 100, as indicated by the bidirectional arrow 108. In other embodiments, the response receiver 106 can be a chemical response receiver, an electrical response receiver, a mechanical response receiver, or a thermal response receiver.

Figure 2:
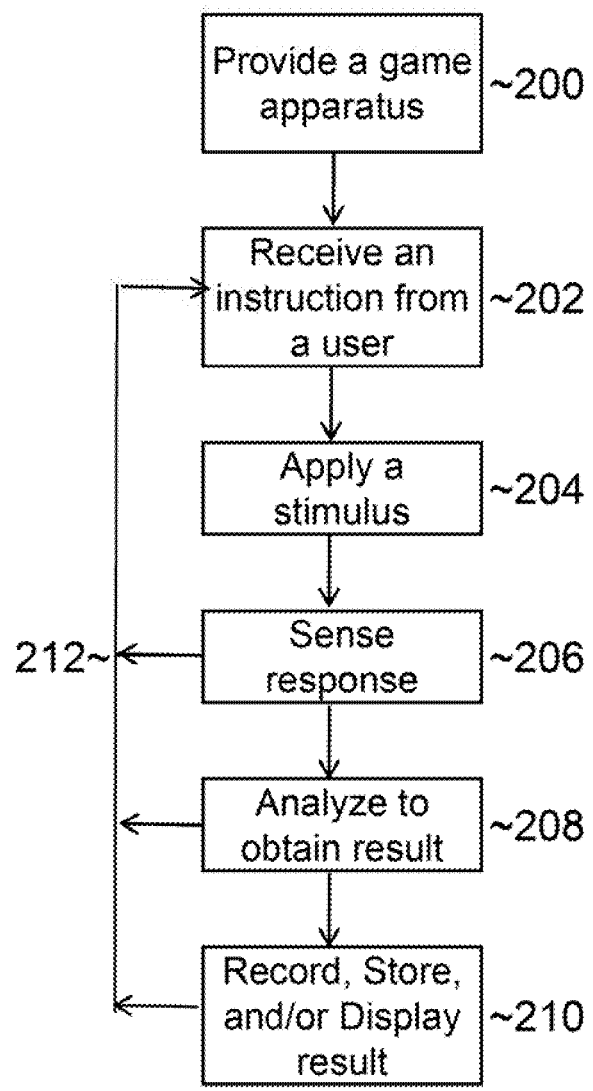
FIG. 2 is a flow diagram illustrating the operation of a game according to the invention.
Figure 3:
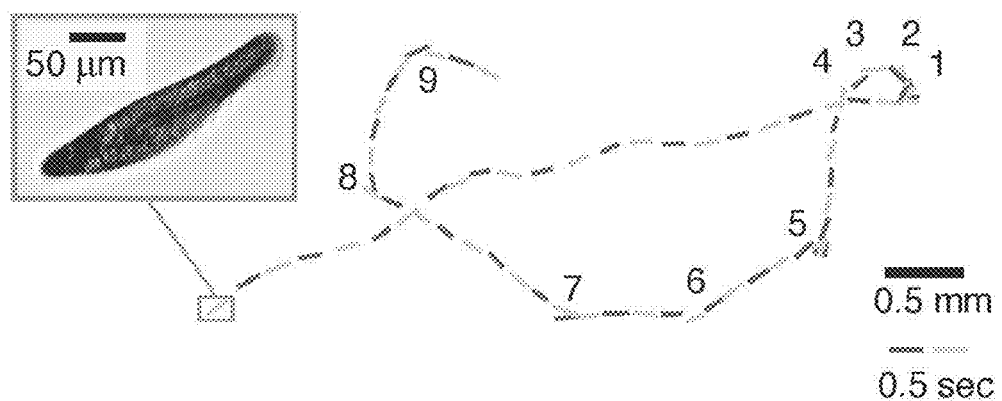
Figure 4:
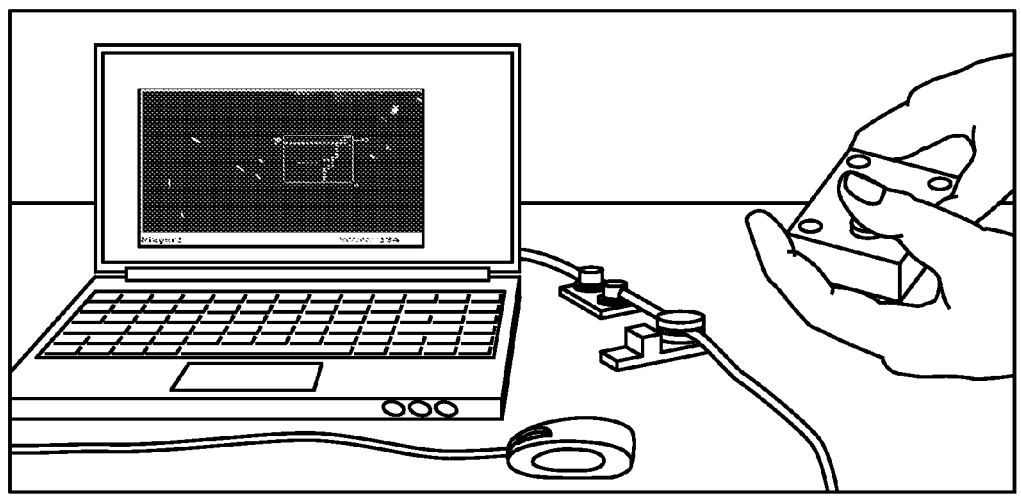
Figure 5:
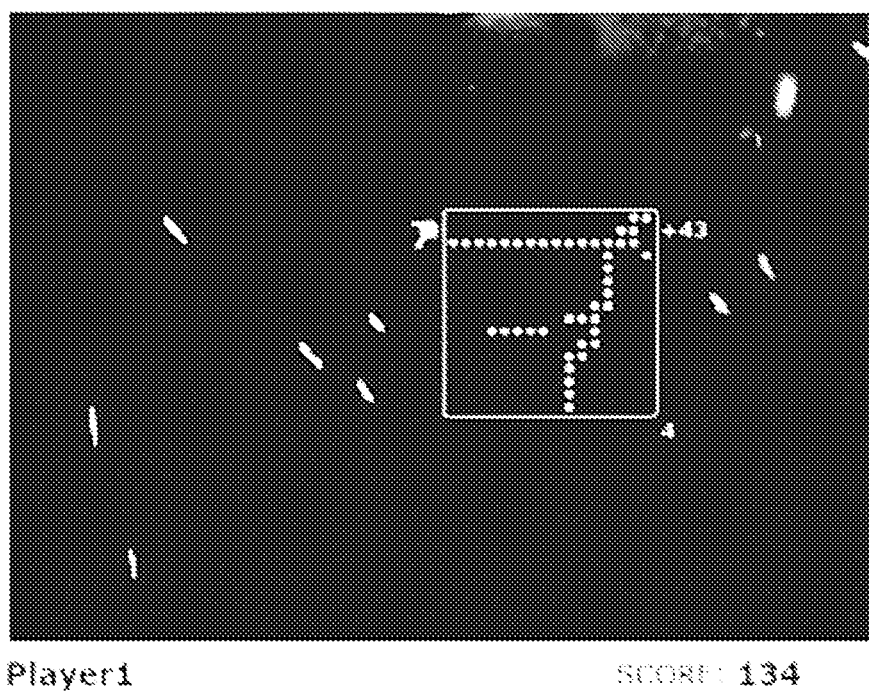

FIG. 2 is a flow diagram illustrating the operation of a game according to the invention. At step 200, there is provided a game apparatus, for example as shown in FIG. 1. The game apparatus comprising a replaceable cartridge having a chamber containing a biologically active component. The step of providing the game apparatus can include providing game software recorded on a machine-readable medium.

At step 202, the apparatus receives an instruction from a user.

At step 204, a stimulus is applied to the biologically active component according to pre-defined rules of a game and in accordance with the instruction from the user.

At step 206, a response of the biologically active component to the stimulus is sensed.

At step 208, a computer-based game controller analyzes the response of the biologically active component according to pre-defined rules of the game to obtain a result.

At step 210, at least one of recording the result, transmitting the result to a data handling system, or to displaying the result to the user is performed.

The method or process can operate in an iterative manner. A sensed response, an analysis to obtain a result, or a result itself can be used to provide input to the method at step 202, as input from a user who may wish to provide an additional instruction or as input from a programmed set of rules of a game.

We now describe some exemplary embodiments of games as contemplated by the invention.

1. The paramecia game basically demonstrates how we can integrate into conventional video games biological processes
2. The PCR game demonstrates how we can provide "biotic game kits" that can be used for teaching purposes on modern biotech equipment
3. The yeast game illustrates the inclusion of olfactory senses Games are a significant and defining part of human culture, and their utility beyond pure entertainment has been demonstrated with so-called 'serious games'. Biotechnology—despite its recent advancements—has had no impact on gaming yet. Here we propose the concept of 'biotic games', i.e., games that operate on biological processes. Utilizing a variety of biological processes we designed and tested a collection of games: 'Enlightenment', 'Ciliaball', 'PAC-mecium', 'Microbash', 'Biotic Pinball', 'POND PONG', 'Polymer-Race', and 'The Prisoner's Smellemma'. Biotic games exhibit unique features compared to existing game modalities, such as utilizing biological noise, providing a real-life experience rather than virtual reality, and integrating the chemical senses into play. Analogous to video games, biotic games could have significant conceptual and cost-reducing effects on biotechnology and eventually healthcare; enable volunteers to participate in crowdsourcing to support medical research; and educate society at large to support personal decisions and the public discourse on bio-related issues.

We characterize these games primarily under the following aspects: (i) The generalized rules defining the game: both man-made rules and implicit biophysical constraints; (ii) how the emergent features of these rules influence winning and play strategies; (iii) what unique biotic features differentiate them from existing games; and (iv) applications.

First Embodiment: Action Games at the Single Cell Level

The first game is inspired by early action video games where players steer virtual objects on a screen. In the biotic game adaptation these objects are not virtual, instead they are living paramecia contained inside a biotic game console. The human player interacts with these paramecia via a traditional game controller and observes their responses on a video screen with a superimposed virtual game environment.

Paramecia are ciliated, single-celled organisms that swim around in a run and tumble like motion by stochastically switching their swimming direction. Paramecia respond to external electrical fields by swimming towards the cathode, a phenomenon termed galvanotaxis. For the game setup, these paramecia are contained in a square fluid chamber, which has electrodes arranged along each side. The human player controls a swarm of these paramecia by applying electric fields along two axes via a hand-held device reminiscent of a conventional video game controller. The motion of these paramecia is captured with a webcam and displayed live on a computer screen. This set-up operates a game by overlaying virtual graphic objects onto the live video and defining how these virtual objects behave relative to the displayed paramecia. A game score is computed based on these interactions, which are ultimately influenced by the human player's actions.

This set-up enables the design of many different games. In a game called 'Enlightenment' squares filled with 'off-dots' pop up on random sections on the screen. The human player scores points by steering paramecia through those dots and lighting them. In a game called 'Ciliaball' the paramecia kick a virtual soccer ball into one of two goals. In a game called 'PAC-mecium' (inspired by 'PAC-Man') the paramecia collect virtual yeast food and are occasionally bitten by a virtual zebra-fish larva. In a game called 'Microbash' (inspired by 'Breakout') the paramecia bounce a ball to remove virtual blocks, which eventually reveals the detailed schematic of a paramecium. These games have been test played by different people including visitors at a public event outside the lab. Adding fresh paramecia to the set-up takes about 5 minutes, and are typically playable for more than an hour. The chip is reusable after cleaning.

In these games, the novelty in play experience compared to traditional video games arises from the challenge of guiding multiple objects simultaneously and from the inherent biological nature of the system such as paramecia stochastically changing their swimming direction and often not responding to the applied stimuli as anticipated. Furthermore, the player's knowledge that these processes are real and not simulated influences players perception. For example, the question what these paramecia 'feel' while being steered was raised independently by different players.

Paramecia also respond to chemicals, a phenomenon termed chemotaxis, which motivated us to explore the integration of chemicals into these games as well. We constructed a set-up that enables the player to position and release chemicals from a micro-needle using a micro-manipulator. Analogous to the marbles in a pinball game, as paramecia swim towards the player they are 'kicked back', but instead of a mechanical impulse a physiological response induced by the repelling chemical drives this change in direction. Low Reynolds number hydrodynamics enable long-range non-contact interactions between paramecia and a needle. The relatively slow diffusion of the chemical allows a dynamic 'repellant landscape' to build up during the game. A two-player version inspired by the classic and first commercially successful video game PONG can be realized using two opposing micro-needles with the paramecium swimming in between. In their present form, these chemical games should be regarded as proof of concept as repeated play would require the removal of the released chemicals, which is left for more sophisticated micro-fluidic chip designs in the future. We call these games 'Biotic Pinball' and 'POND PONG', respectively. We expect that such paramecia games would lend themselves well for microbiology and biophysics teaching given that paramecia are already common study material in American high-schools in a more observatory setting. As playing pinball conveys a sense of physical concepts such as gravity, inertia or spin, these paramecia games inform on micro-organismal behaviors, the biophysics of random-walks, diffusion, and low Reynolds number hydrodynamics. Such games are extendable to other microorganisms and alternate control mechanisms, such as photo-activate-able chemicals or direct light in more elaborate micro-fluidic environments and mazes. Students might be motivated to discuss and understand the observed phenomena in order to identify other winning strategies in such games, and multi-player games may increase competition and learning motivation.

Second Embodiment: Betting Games and Logic Games at the Molecular Level

The second biotic game is inspired by horse racing where players make educated bets on the order that specific horse-jockey pairings (C and X) reach a finish line. In the biotic game adaptation, players bet on when DNA amplified by specific PCR primer pairings will reach a preset detection threshold during PCR.

PCR (polymerase chain reaction) is a widely used molecular technique that uses a cyclic heating and cooling process to amplify DNA sequences specified by the binding locations of forward and reverse PCR primers on a DNA template. Individual reactions take place simultaneously inside a PCR thermo-cycler machine. The relative amount of DNA present in each reaction can be tracked in real time via a fluorescent signal. In a perfect reaction, this amount increases exponentially, doubling every cycle; thus an eight fold lower starting DNA concentration should reach threshold three cycles later. In practice, the number of cycles required to reach a given threshold not only depends on the initial DNA template concentration but also on reaction efficiency, which is influenced by reaction conditions and the length of the amplified DNA sequence. Additionally, if forward and reverse primers are incorrectly oriented, no template is amplified.

The game is played with three forward and three reverse primers, from which a set of 12 reactions is prepared. Each reaction contains a random primer combination as well as a DNA template at progressively two-fold lower concentrations. Based on these conditions, individual reactions will reach threshold at different cycle numbers during the race; and some reactions will never reach threshold at all. Additionally, the PCR cycle conditions are set such that some products are not amplified with optimal efficiency.

At the game start, the two players are given the primer pairings, the DNA template concentrations, and which primers are forward and which are reverse, i.e., the full information shown in FIG. 12. The order of primers relative to each other is not revealed. The game starts and ends at cycles 5 and 24, respectively, which is approx. 20 minutes—a time that is naturally determined by the biochemical reaction conditions. PCR results are updated every cycle. Players use this real-time information to bet if and when a chosen reaction will reach threshold. A bet consists of a player making public their prediction of at what cycle a specific reaction will reach threshold or if that reaction will not reach threshold by cycle 24. Each player can place only one bet for each reaction, and the opposing player cannot make the same bet but may bet on the same reaction reaching the threshold at a different cycle. Bets may be placed at any time during the game, including after a reaction has reached threshold, and bets may not be retracted or changed. After the game, correct bets are awarded one point, and wrong bets are penalized two points. The first player to correctly predict the relative order of all primers receives 5 additional points. The player with the most points wins. We call this game 'PolymerRace'.

Figure 10:
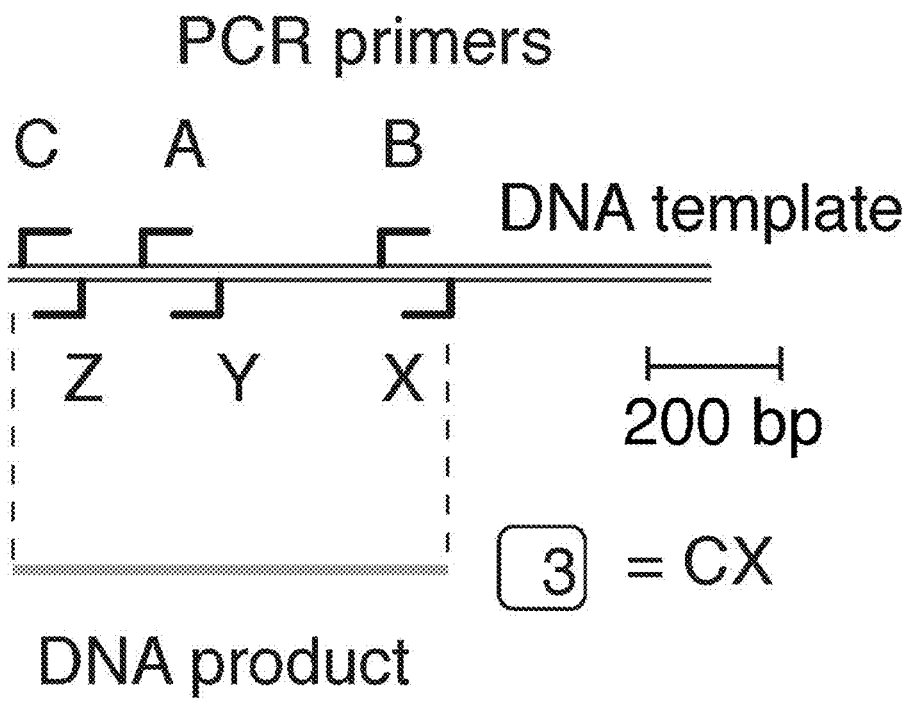
Figure 11:
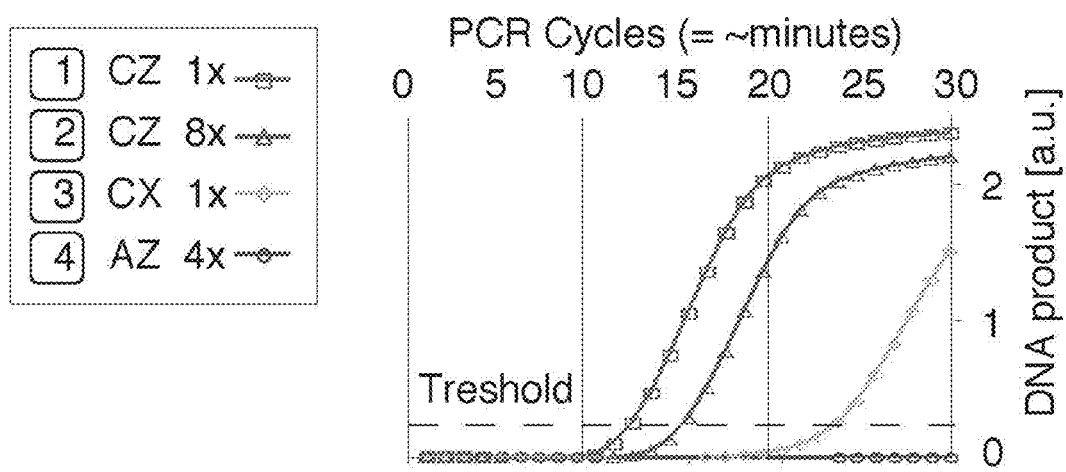

The play challenge (and enjoyment) emerges from competition among players to be the first to place a given bet. With every cycle the players obtain new information about the relative order of the primers and the reaction efficiencies of individual primer pairings, all of which guide them in making predictions about the reactions. For example, if reaction efficiency was perfect Reaction (RXN) 7 should come up 3 cycles after RXN 2; in contrast RXN 1 is rather inefficient which has consequences for RXN 4. The results of RXNs 1-8 contain the full information to deduce the relative order of all primers in FIG. 10. Thus, strategy emerges from the trade off between risky bets based on limited information and the danger of losing secure bets to aggressive or logic-driven players.

During the initial cycles of the game, players familiarize themselves with the reaction conditions (FIG. 12). The following cycles are filled with processing information, placing bets and analyzing opponents' bets, which keeps players engaged throughout the entire game. Additionally, the PCR machine used here computes baseline corrections while running leading to shifts in displayed data-points and partially influencing the outcome of already placed bets. Combined with the error sources of the experiment (compare RXNs 11 and 12) this adds an element of chance and unpredictability to the game. Setting up a new game, i.e., preparing all reactions, takes about one hour, and the regents and equipment involved lead currently to a non-negligible cost. Playing the game by watching a prerecorded. PCR-run alleviates these inconveniences.

Figure 13:
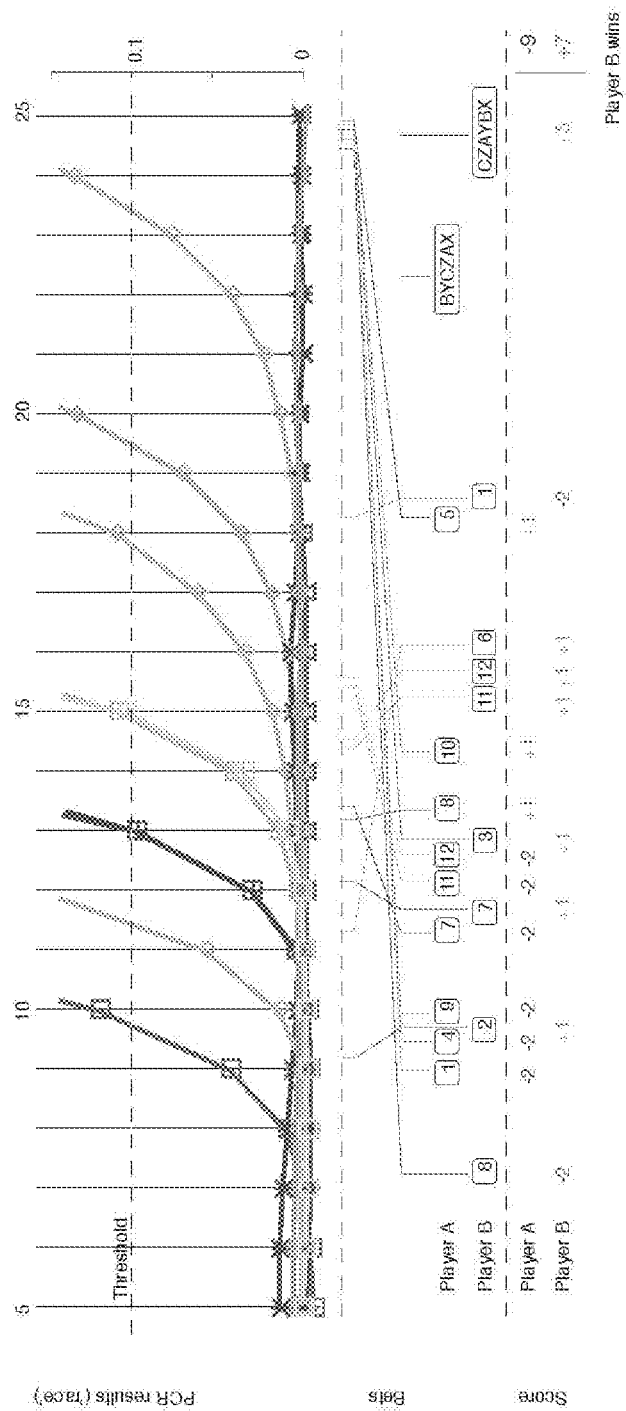

Molecular games like 'PolymerRace' are suitable for undergraduate biology teaching as well as effective demonstration and training tools for PCR machines and other commercial biotechnological equipment—similar to the video game 'Space War' that was delivered along with the PDP1-computer in the 1960's. The pseudo-random reaction set used here (FIG. 12) generates results (FIG. 13) that enable players to measure reaction efficiencies based on dilution series (RXNs 2, 7, 11, and 1, 4, 9 for efficient and inefficient primer pairs, respectively) and experimental reproducibility of the used PCR machine (RXNs 11, 12). Therefore, such games can make an entertaining but also educational use of the lengthy run time by motivating the close observation and interpretation of what happens during the experiment.

Third Embodiment: Olfaction-Strategy Game at the Multi-Cellular Level

Figure 14:
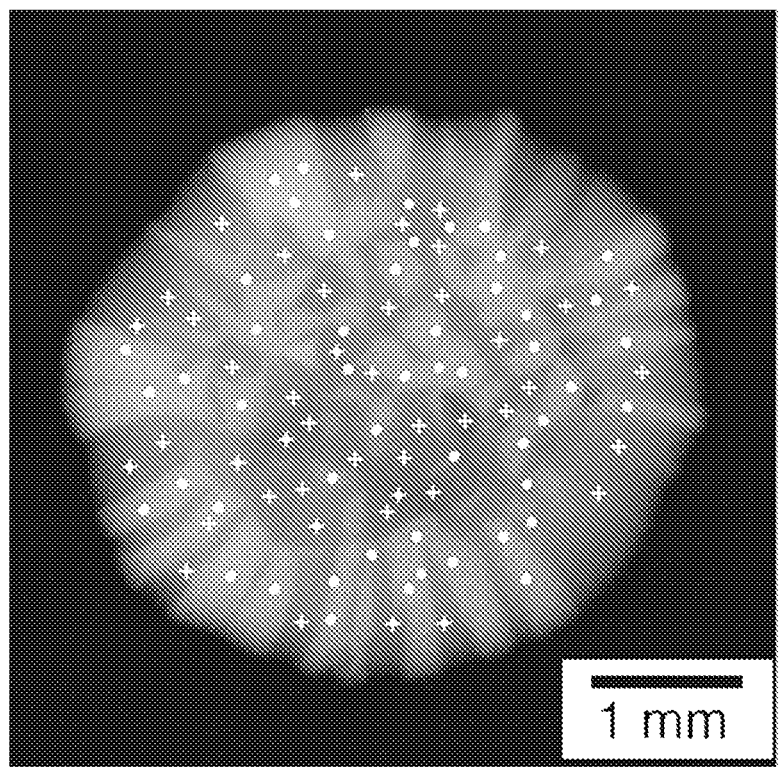
FIGS. 14-17 illustrate the multi-cellular game 'The Prisoner's Smellemma' which utilizes colored yeast to integrate the olfactory senses into the game play.

The third game adapts the iterated 'Prisoner's Dilemma'. In this game, two players aim to maximize their own score according to a pay-off matrix by cooperating or defecting on the other player over repeated rounds. We utilize yeast (FIG. 14) with their characteristic bread-vinegar-like smell to add an olfactory challenge to this game.

Figure 15:
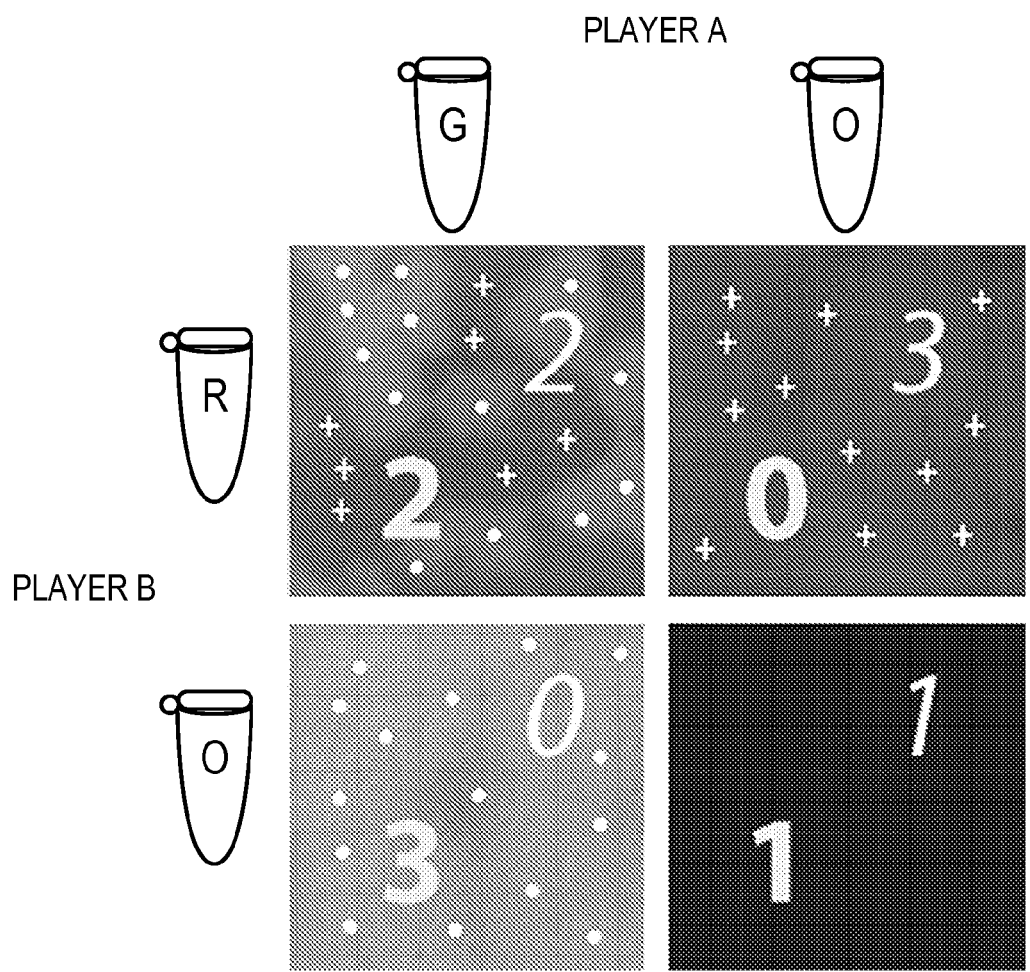

Before the game, each player receives one of two yeast strains diluted in buffer as well as a sample of buffer only (FIG. 15). These yeast strains are genetically modified to express either a red or green fluorescent protein. This expression can be visualized by seeding a sample on an agar plate and incubating it for 1-3 days. When colonies are mixed, a red-green patterned yeast colony emerges (FIG. 14) due to a competitive growth process. During each round of the game, both players choose to contribute equal volumes of either their yeast strain ('cooperating') or the pure buffer ('defecting') to a common empty tube with their score depending on a pay-off matrix (FIG. 15). Since the game is played over multiple rounds, players need to infer whether the opponent is cooperating or not. In contrast to the conventional version of the prisoner's dilemma this information is not revealed directly to the other player, instead both players have to gather that information purely by smelling on the well-mixed tube.

Figure 16:
Figure 17:
Figure 17:
Figure 17:
Figure 17:
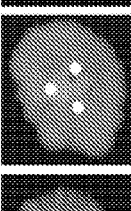
Figure 17:
Figure 17:
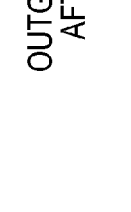
Figure 17:

We found that humans can smell the difference between opponent adding yeast or pure buffer (FIG. 16). The success rate is not perfect, but significantly above chance thereby providing a play challenge. The trend that correlates classification success with relative concentration change may be expected from human olfactory psychophysics experiments. Determining the opponent's choice based on smell represents noisy information and guides players in their strategy for subsequent rounds (FIG. 17, upper part). After the game, the result of the player's choices (FIG. 17, lower part) is revealed unambiguously by seeding a sample from each round's tube on an agar plate. The results of the various yeast colonies after outgrowth can then be matched to the pay-off matrix (FIG. 15). A single game lasts eight rounds. The goal is to gain the highest score in a multi-player tournament rather than winning a single game. The game can be set-up within 5 minutes and takes about 10 minutes to play. We call this game 'The Prisoner's Smellemma'. There are less time-consuming ways to confirm the players choices than growing colonies, yet the resulting red-green patterns (FIG. 14, FIG. 17) might inspire the design of other games where the spatio-temporal growth processes would enable game dynamics related to Go, Reversi, or Hex. Engineering the required genetic networks would provide interesting applications for synthetic biology or new pattern formation paradigms for developmental biology and 'evolutionary games'. Note the significantly different usage of the term 'game' as humans may act as objective observers or actual players. 'The Prisoner's Smellemma' also demonstrates how biotic games facilitate the natural integration of the human chemical senses into play, while conventional games are almost exclusively restricted to the visual, acoustic and mechanical senses. Olfactory games have many applications, for example widening the joyful life experience of visually or acoustically impaired people, or enabling self-monitoring for neurological diseases like Alzheimer's or Parkinson, where severe olfactory dysfunctions have been reported to appear much earlier than those on cognition or movement.

These three biotic games demonstrate play-ability from the molecular to the multi-cellular scale, and we expect future biotic games to provide even more distinct gaming mechanisms compared to existing modalities—the complexity and variety of today's video games were similarly unforeseeable at their beginnings.

Figure 18:
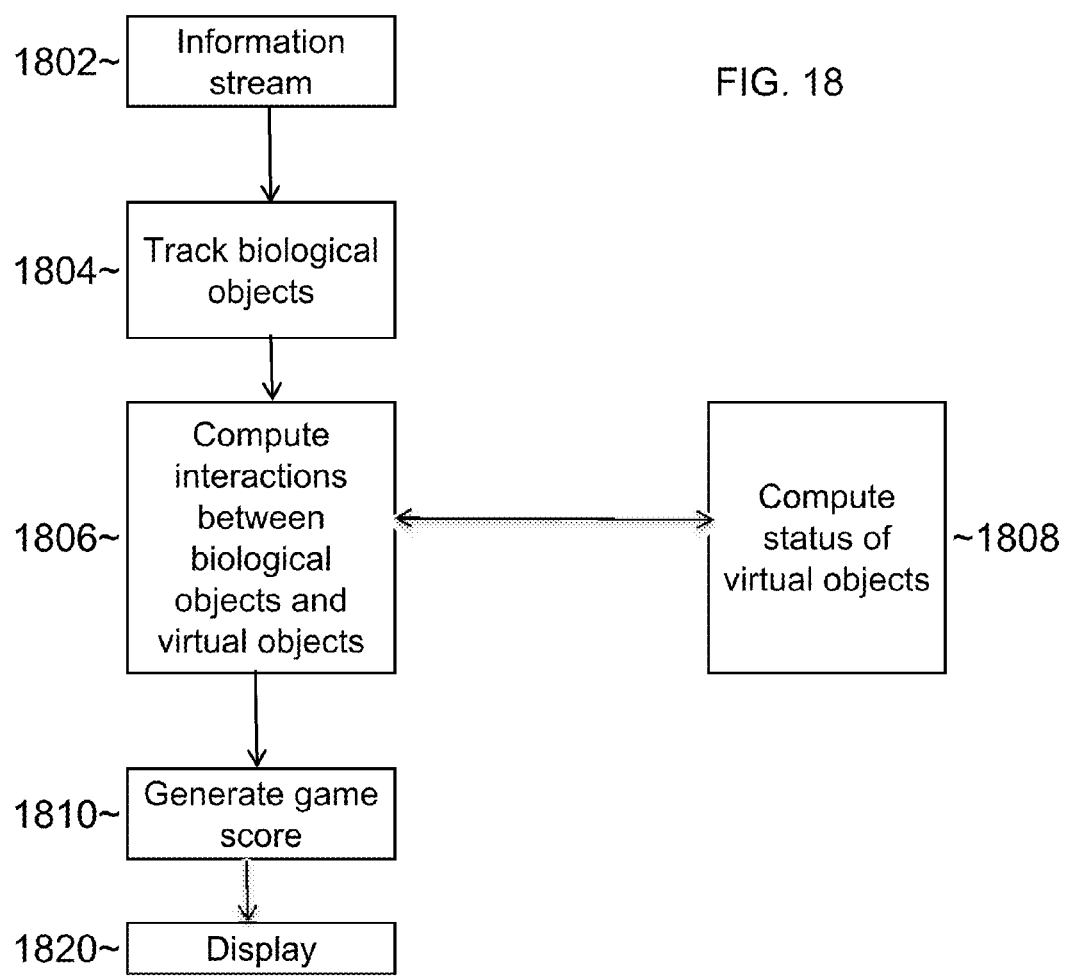
FIG. 18 is a flow diagram illustrating how software can be used to control a game according to the invention.

FIG. 18 is a flow diagram illustrating how software can be used to control a game according to the invention, in which uni-directional and bi-directional arrows indicate the flow of information. The various steps can continue to operate in parallel, in sequence, and iteratively, as needed to provide a continuing game experience.

At step 1802, the apparatus operating under software control accepts an information stream (such as data from the game).

At step 1804, the apparatus operating under software control tracks the biologically active objects in the game.

At step 1806, the apparatus operating under software control computes interactions between biological objects and virtual objects (e.g., what would happen if a biological object comes in contact with an object represented by a virtual object).

At step 1808, the apparatus operating under software control computes the status of virtual objects.

At step 1810, the apparatus operating under software control computes a game score.

At step 1820, the apparatus operating under software control displays information about game (such as the information available at any of steps 1806, 1808, and 1810) and its progress to a user.

Figure 19:
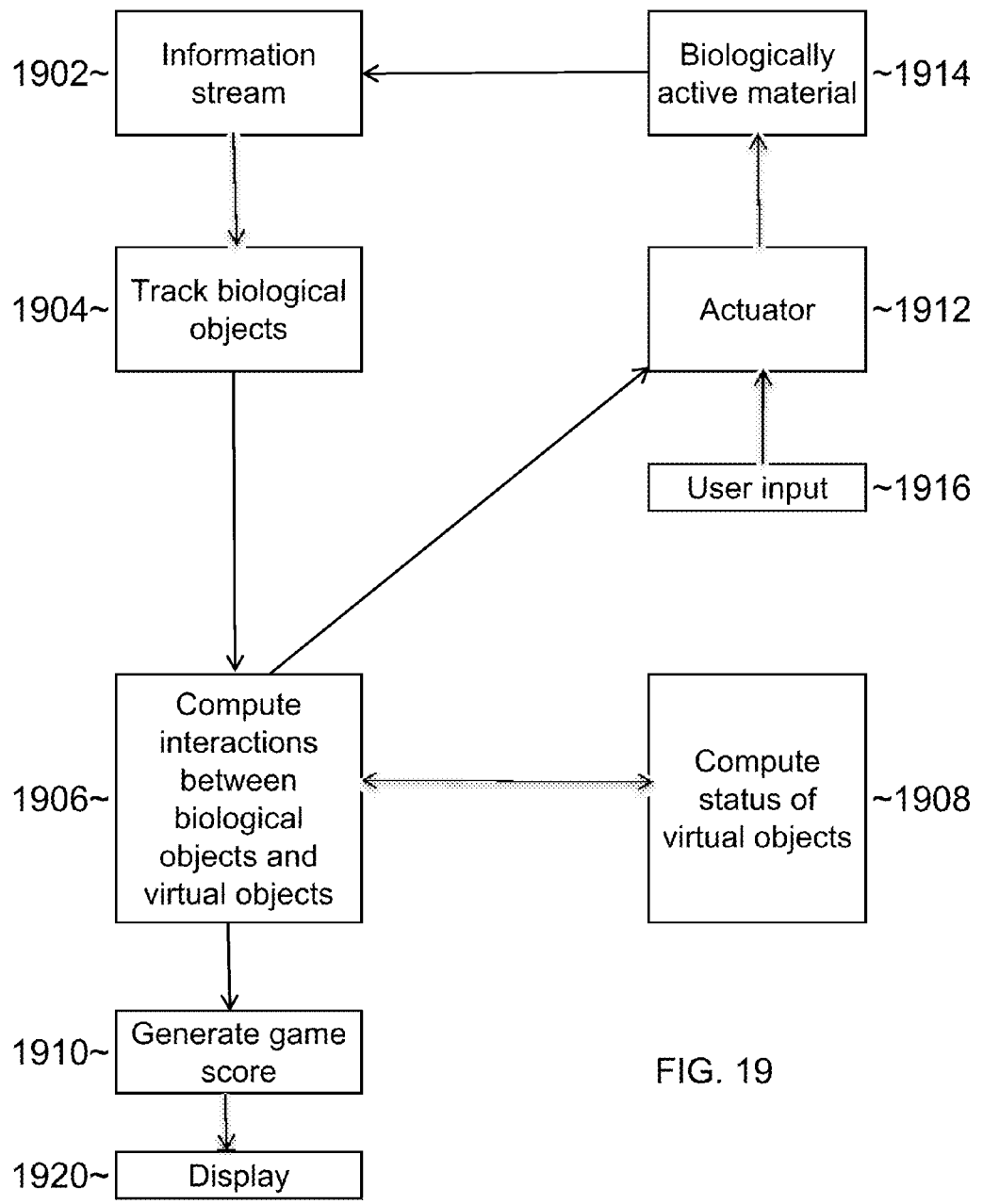
FIG. 19 is a flow diagram illustrating how user input and software can be used to control a game according to the invention.

FIG. 19 is a flow diagram illustrating how user input and software can be used to control a game according to the invention, in which uni-directional and bi-directional arrows indicate the flow of information. The various steps can continue to operate in parallel, in sequence, and iteratively, as needed to provide a continuing game experience.

At step 1902, the apparatus operating under software control accepts an information stream (such as data from the game).

At step 1904, the apparatus operating under software control tracks the biologically active objects in the game.

At step 1906, the apparatus operating under software control computes interactions between biological objects and virtual objects (e.g., what would happen if a biological object comes in contact with an object represented by a virtual object).

At step 1908, the apparatus operating under software control computes the status of virtual objects.

At step 1910, the apparatus operating under software control computes a game score.

At step 1920, the apparatus operating under software control displays information about game (such as the information available at any of steps 1906, 1908, and 1910) and its progress to a user.

At step 1916, the apparatus operating under software control accepts input from a user.

At step 1912, the apparatus operating under software control operates an actuator to generate a stimulus.

At step 1914, the apparatus operating under software control applies a stimulus to biologically active material.

On what time scale could we expect such games to mature and have a significant impact? For biotic games, we expect that the underlying technologies will advance at a higher rate such as the integration density on micro-fluidic devices beats Moore's law for electronic circuits, since conventional computer and web technology nowadays could take over non-essential 'biotic features' of games, and if their development were pursued more actively than was done initially for video games.

As with video games, biotic games could become significant economic, technological, and scientific drivers: Biotic games could help to produce technological price drops that positively feed-back onto healthcare and research investments—imagine PCR machines as common household applications for gaming and recognizing spoiled food—similarly unthinkable as personal computers 50 years ago and which were often purchased for gaming purposes.

Technologies primarily developed for gaming could eventually find more 'serious' applications—similarly as graphics processing units (GPU) developed for real-time video game effects now enable molecular dynamic simulations. Volunteers could also be attracted into 'biotic crowdsourcing' to aid tasks like combinatorial drug screening not only by performing data analysis online but by actually running experiments remotely—similar to solving protein structures or labeling images with the electronic online games 'FoldIt' and 'ESP', respectively.

It is possible that games according to the invention can be played over a packet-based communication system such as the internet, with one or more players interacting with a game apparatus via the internet.

Biotic games have multiple stand-out features compared to existing game modalities: The integration of biological materials and processes below the milimeter scale, the inclusion of olfactory senses, the usage of biological variability and noise as a natural 'dice', and the provision of a true reality experience rather than a virtual one. Immersing video games, which show increasing success in virtualizing biological worlds and experiences, necessarily fall short in a few aspects compared to biotic games: (i) The currently available computational power poses challenges to realistically emulate even modest biological phenomena, such as the swimming of ciliates at low Reynolds numbers; (ii) The details of biological systems are not completely understood, hence the realism is limited by the game designers knowledge; (iii) The experience of holding a pipette or interaction with real chemicals or biological systems still provides a different human experience; and (iv) Certain applications like medical drug screening games (see above) inherently require the interaction with true biology. Since game play always explores the rules and laws of the world that the game is set in, biology teaching might be best set within a truthful biological world, with the gaming situation providing a natural motivation for exploration. Additionally, we expect that implementing the same game electronically and biologically will lead to cross-fertilization between both disciplines thereby help improving the creation of virtual worlds as well as understanding how biological systems behave and function. We also envision an educational impact beyond the student level for society as a whole. The modern life sciences constantly lead to new diagnostic and treatment options that requiring informed decisions from patients, and modern biotechnology can raise substantial public controversies, such as on genetically modified foods, stem cell research, or teaching evolution. Dealing with these issues is challenging as many people have insufficient experience and knowledge about the underlying biological key concepts that are often abstract and unclear. This is in contrast to the integration of computer technology in the developed world. Even children interact with this technology in playful ways, and many of today's self-taught computer experts started out as dedicated video game players. Equivalently, biotic games would enable a significantly higher portion of the population to interact directly or online with biological processes at those small scales. This first hand experience could make them more informed, comfortable, and conscious about what modern biotechnology is, and what its true risks and benefits are. This is a necessity when it comes to personal medical choices or democratic policy making on controversial bio-related topics in order to meet the global health, food, and environmental challenges.

And finally, we hope that biotic games will be played for fun and enjoyment.

In some embodiments with multiple players, some players could directly influence the active biological component while other players will only influence directly virtual objects as in a conventional video game. The actions of both players together then lead to virtual interactions on screen.

In some embodiments, multiple players could interact with multiple different chambers, where those chambers could be at different locations and each player may interact with all or only with a subset of those chambers. The results from all chambers are then displayed on one or multiple screens—either side by side or even superimposed over each other. What happens in those different chambers is then evaluated by the computer, leading to scoring information, but also to direct actions from the computer to individual chambers. Hence the biologically active component in the different chambers interacts with each other virtually.

In some embodiments, the game is a conventional video game, but where the virtual objects are "steered" by biologically active component. For example, instead of showing a movie of the paramecia in real time, the paramecia are tracked and the actions of those paramecia are used to "drive" virtual objects on a screen (either in real time or at a later time)—hence the biological material is used as kind of avatar/artificial player/random number generator. Here the biological component could either be driven/influenced by another human player, or the biological componenten could just act on its own. Furthermore, the virtual display could be a faithful tracking of the biological action (such as the path of a cell moving in 2D is replicated on a 2D screen)—or only part of the biological information is used and/or even further distorted (such as the x coordinate of the cell's movement is used to generate a sound output according to additional rules.)

The devices described could also be used in a non-game form without any user input, but rather as decoration or an art form. For example, paramecia could drive virtual objects on a computer screen as a screen saver.

Methods

Paramecia Culture

Paramecium caudatum was obtained from Biological Resource Center 8030 85th St, Amery, Wis. 54001 and ordered through Mountain Home Biological Inc., P.O. Box 277, White Salmon, WA 98672. Paramacia were either used directly within 5 days after delivery, or from a colony established in the lab. Different methods were used to concentrate Paramecia: For example, placing 50 ml of the paramecia stock solution into a Nunc vacuum filter (care was taken not to take too much dirt which typically had settled to the bottom) and about 90% of the buffer was sucked away (termed 'standard buffer'). Alternatively, electrodes spaced 1 cm apart where placed into the paramecia stock solution and 6V were applied; after a few minutes paramecia concentrate near the cathode and sucked up with a pipette. Paramecia were then kept at their concentration or later diluted back into standard buffer or Tris-buffer (1 mM Tris, 1 mM Citric acid, 1 mM $CaCl_2$, pH=7.0).

Electrical Control of Paramecia

Figure 6:
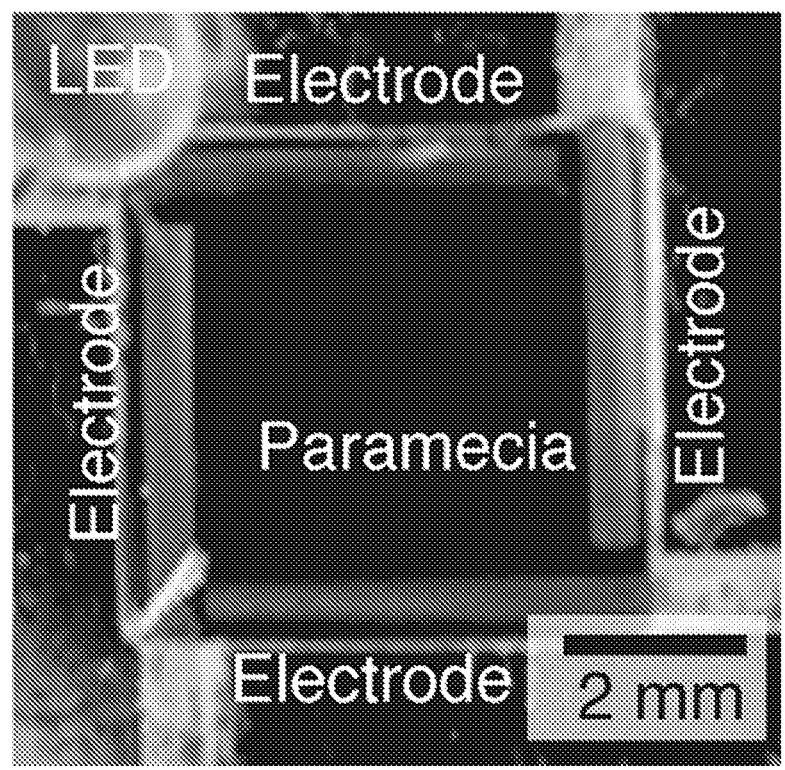
Figure 7:
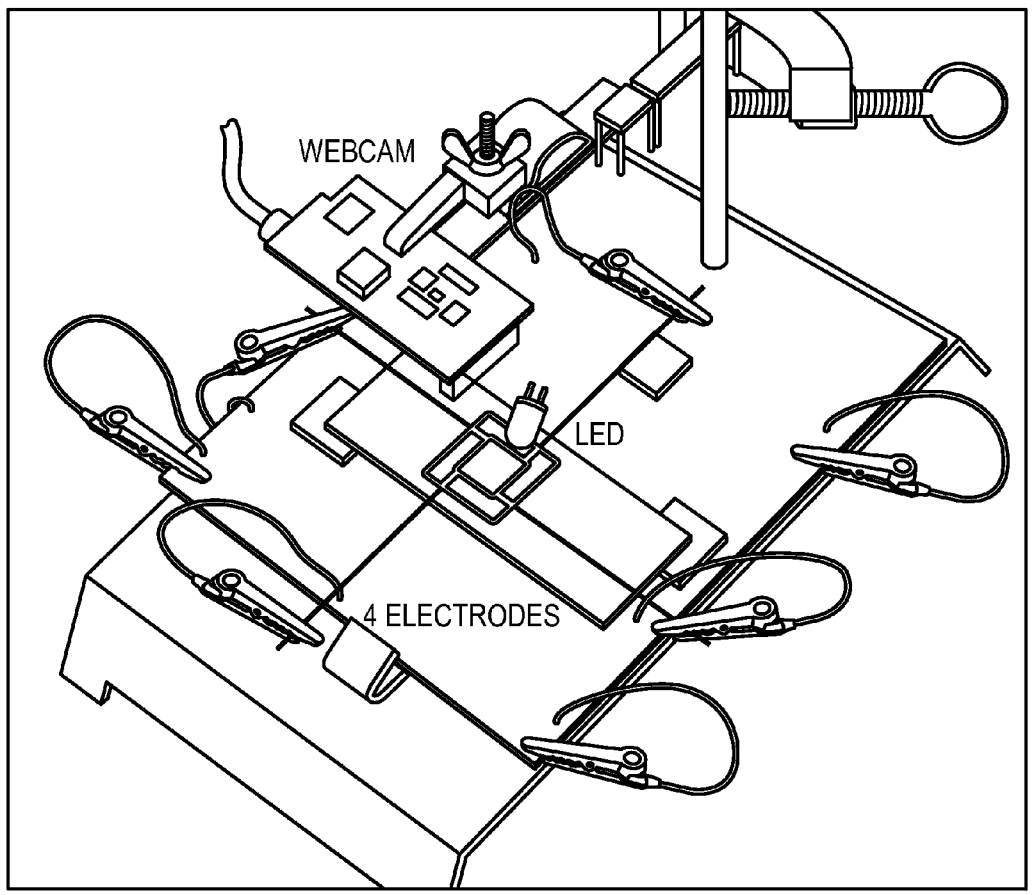
Figure 8:
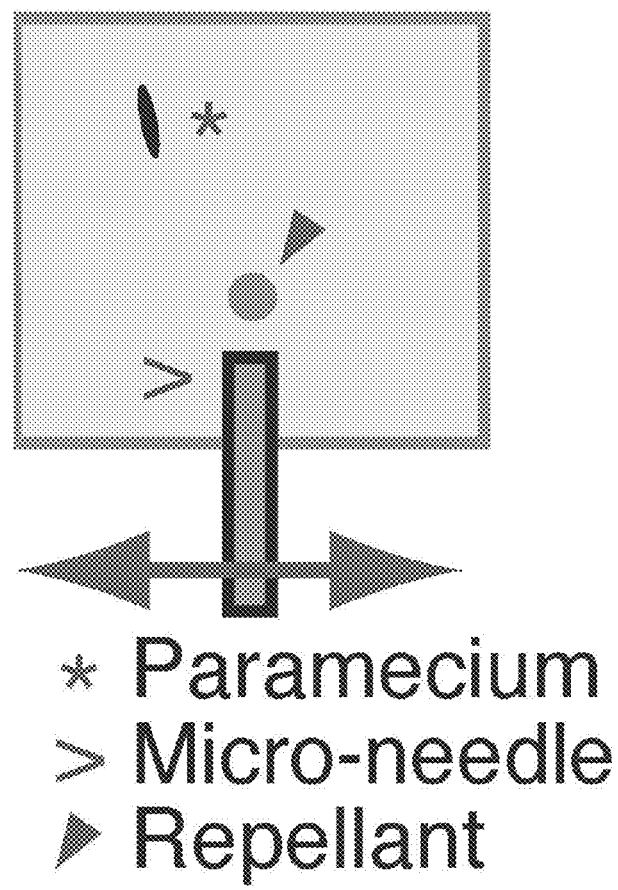
Figures 9A, 9B, 9C, 9D:
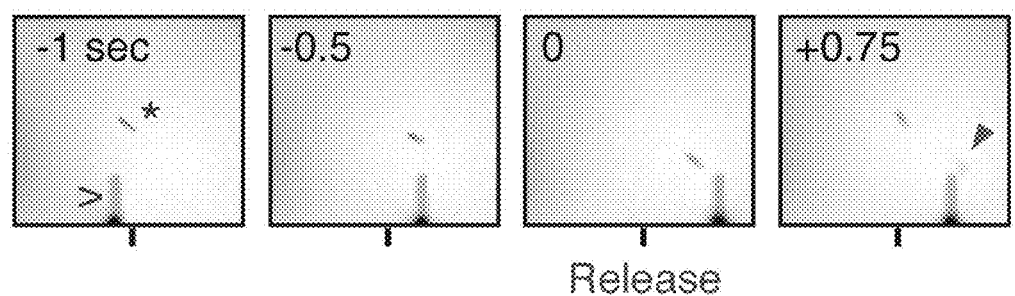
FIGS. 9A to 9D show a time sequence from the game 'Biotic Pinball' showing the successfully induced reversal of paramecium swimming direction after re-positioning the micro-needle and releasing a chemical repellant. The number at top of each FIG. is the relative time in seconds.

The fluid chamber (FIG. 6) with dimensions 10 mm×10 mm was made out of 1.5 mm thick acrylic using laser ablation. Elongated holes were rasterized at the four corners of the chamber using laser ablation to enable insertion of the four electrodes (FIG. 6, FIG. 7). The chamber was glued on microscope slides (WVR) using an Instant Adhesive (PartsMaster™). Four carbon electrodes with 0.9 mm diameter (Pentral; typically used for pens) were inserted through the rasterized holes. Carbon electrodes are more bio-compatible than metal ones. The chamber was sealed off on all sides with epoxy to avoid leakage and stabilize electrode positions. Paramecia were loaded into the chamber with a transfer pipette. Cover glass was occasionally used to seal the chamber against evaporation. Paramecia were typically refreshed after 3-4 hours.

A PCB (printed circuit board) was prepared to serve as housing stage for the fluid chamber and to facilitate the electric connection between chamber and game controller. The PCB consisted of LED for illumination, eight crocodile clips for electrode connections and a 10-pin header connector for receiving the push button connections on the game controller. The layout of the PCB was drawn by hand using a Sharpie black marker on the copper side, and then the PCB was put into a Ferric Chloride solution (MG Chemicals) to etch away extra copper. The backside of the PCB board faced the fluid chamber and was painted with Sharpie black marker to provide an anti-reflective background for dark field imaging. Two Lshaped restraints were glued on the backside of the PCB to fix the position of the chamber on the PCB stage. For game play, the chamber was placed in between the L-shaped restraints and electrodes were connected to PCB board by crocodile clips.

The game controller consisted of four push buttons (Digikey, CKN1639-ND) to control the field direction along two axes, an on/off switch (Digikey, 450-1521-ND) to turn on the LED (Linrose, BCMD333UWC) on the PCB stage and a 2 K-ohm potentiometer (Fry's Electronics, NTE 502-0104) to arrange the intensity of LED. The LED was connected to 6V (3V Enercell batteries in series) through the on-off switch, the potentiometer and a 100 ohm resistor. When pressed, push buttons connected the 3V batteries to generate fields of 3V/cm, which is about 3 times more than required to evoke responses, and 3 times lower than what would significantly reduce life time of paramecia. One pair of electrodes was always short-circuited when the other pair was activated, which minimized charge build-up at electrodes and led to more precise control of the paramecia. All electrical components were soldered on a prototype board (RadioShack, Model:276-148). The game pad hardware was enclosed in a black project box (RadioShack, Model: 270-1803) and push button connections on the game pad were transferred to PCB stage (on which the chamber was placed) by a ribbon cable and an idc-socket.

The paramecia were imaged and recorded with a standard commercial webcam (Logitech C905). The webcam was first dissembled and an additional 5-10× lens (RadioShack) was put in front of the webcam lens. The webcam was mounted on a standard clamp stage and positioned for optimal focus (FIG. 7). The light coming from the LED entered the chamber nearly horizontally, leading to dark-field illumination with bright paramecium on a black background. Live video was streamed to a PC laptop, and the imaged region and illumination condition were optimized via the camera control software that had been supplied with the webcam.

Flash Game Interface

Custom software for the games was written using Adobe Flash CS5. The display of the game screen comprised of the live video monitoring the fluid chip and the superimposed virtual game graphic objects. At the beginning of each game, still images of the live video were captured for 6 seconds at 30 fps and averaged to produce a background image for motion tracking of paramecia. During game play images were acquired at 10 fps, from which the background image was subtracted. Rescaling and thresholding of the subtracted images reduced noise for detecting changed pixel value within the images, i.e., high pixel values corresponded to paramecia. Each virtual flash objects then assays whether it coincides with high pixel values, and if so, triggering corresponding actions, for example moving a virtual ball.

Chemical Control of Paramecia 2,4-dichlorophenoxyacetic acid (Sigma-Aldrich) (short: 2,4-D) was used as repellant at a stock concentration of 2 mM in ddH20. 2,4-D works as a repellent for paramecia, which was qualitatively confirmed using a T-maze assay, as well as with the actual games. To visualize the repellant it was mixed 5:1 with 5% Phenolred (Sigma-Aldrich) in 5 mM Hepes.

Micro-needles (World Precision Instruments; Item NO. 4878) were pulled on a micropipette puller (P 80/PC; Sutter Inst. Co.). Needles were broken open at the tip using a forceps with an approximate opening diameter of a typically injection needle (5 µm)—although significantly smaller ones worked also. Mineral oil was injected with a syringe from the backside (large opening) and the needle was mounted onto an oil-driven injector (Nanoject II Auto-Nanoliter Injector; Drummond Scientific). The injector was held by a 3-axis micromanipulator (Merzbacher). Then the needle was filled with the dyed 2,4-D solution.

Fluid chambers were made by placing micro cover glass (VWR) on Microscope Slides (Fischer) separated by four layers of double-sided Scotch tape.

Cover glass and tape was cut to size with a diamond cutter and a razor blade, respectively. Different chamber designs were realized. The solution with paramecia was loaded into one side of the fluid chamber, and the 'standard buffer' into the second one, with an air gap between the two. The needle with repellent was placed into this gap. At the start of the game this gap was bridged with an additional drop of buffer. Individual games required significant preparation time as chambers were often not reusable. Additionally, games varied in play experience as timing and number of paramecia entering the playfield relied on their random behavior. Hence the presented results should be regarded as proof of principle with a game setup as reliable as the one using the electrical control awaiting future work.

Games were either played by direct observation through the binoculars or by watching the simultaneous video camera recording on a screen. Movies and images were taken on two different systems: An AxioCam HRc (Zeiss) with the acquisition software AxioVision (Zeiss) on an Olympus MVX10, and an AxioCam HRm (Zeiss) with the acquisition software AxioVision (Zeiss) on an AxioImager (Zeiss)—in both cases using bright field illumination. Movies were taken with different resolutions and frame rates of about 20 fps. Game scores were overlaid afterwards on the movie by hand.

PCR

A 5260 by sized pCS2 plasmid with an H2B-cerelum insert was linearized at the Not1 cut site. Plasmid was used at a working concentration of 3.4 ng/µl, and stored at −20° C. Primers were designed using Genious 4.7.4 (Biomatters). Inside a continuous part of the pCS2 region successive blocks of 200 by were assayed for the best possible primer pair that had a melting temperature between 57 and 58° C., a primer size between 20 to 40 pb, a GC content between 40 and 60%, a GC clamp of 2, and a resulting product size above 70. Among those following 6 primers were chosen (FIG. 10):
F_0036—CTTTTGTTCCCTTTAGTGAGGGTTAAT-TGC; R_0140—CGTATGTTGTGTGGAATTGTGAGCG;
F_0249—CTGCATTAATGAATCGGCCAACGC;
R_0390—CCGTATTACCGCCTTTGAGTGAGC;
F_0692—GTAGGTATCTCAGTTCGGTGTAGGTCG;
R_0799—ACTCAAGACGATAGTTACCGGATAAGGC.
Nomenclature indicates directionality and distance in basepairs relative to the cut site. Primers were ordered from IDT prediluted in 100 µM IDTE Buffer pH 8.0. Primers were further diluted 1:10 in distilled water, aliquoted, and stored at −20° C. All primer combinations were tested to give specific products of expected size under optimal conditions.

PCR reactions were assembled on ice using the Rotor-Gene SYBR Green PCR kit (#294972, Quiagen). Each primer was at a final concentration of 1 µM. DNA was at progressively lower concentrations (FIG. 12) with the highest concentration of 0.005 ng/µl, and RNAase free water to reach final volume of 25 µl. PCR was run on a Mastercycler ep realplex 4 (Eppendorf) with 5' at 95° C., followed by 30 two-step cycles of 10' at 95° C. and 20' at 60° C., which is approx. 1 min per cycle. To minimize cost of reagents and setup-time a variety of games were carried out on a custom made MATLAB (Mathworks) program simulating the PCR machine. Furthermore, movies were taken from the display of the PCR machine during the run of a game and then played back to players who had not seen the data set before. The betting during the game was tracked with labeled 1.5 ml eppendorf tubes.

Yeast

Two Yeast strains (*S. cerevisiae*) ubiquitously expressing GFP or RFP, were grown and maintained in YPD media (5 g yeast extract, 10 g peptone, 10 g dextrose, in 500 ml water) at 28° C. and 4° C., respectively. 1 hour before game play, 1 ml of each Yeast strain was diluted in PBS in a 50 ml Eppendorf tube giving an optical density (OD) of 0.8 and kept at room temperature. Each player then received the corresponding strain, and another 50 ml tube with pure PBS. During each round of the game both players added 500 µl from one of their tubes to a 1.5 ml Eppendorf tube. The tube was colored to prevent visual inspection of the liquid. The tube was gently mixed and then both players were allowed to smell. Which player smelled first alternated between rounds. After all rounds of a single game, 0.5 µl from each tube was seeded on an YPD agar plate (Teknova). The plate was incubated for 24 hours at 28° C. and imaged under red and green fluorescence (Leica M205 FA/DFC 500). If larger scale patterns for visual effect were desired (FIG. 14), solutions were diluted up to 300× with PBS and grown correspondingly longer.

Before the actual game, players were often familiarized with the iterated 'Prisoner Dilemma' by playing the standard version against each other on paper or against an artificial player found online. Furthermore, two sets of smell tests with 10 randomized tubes each were done that mimicked the smell test encountered during the game: One set had either nothing or half the yeast concentration, and the other half or the full concentration (compare smell test in FIG. 16).

Definitions

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Software

Text files representing computer instructions written in Flash for several games are provided as appendices hereto. The games include "Pacmecium," "CiliaBall," "MicroBash," and "Enlightenment." Flash is a proprietary authoring software that can be used to create vector graphics-based animation programs. Flash is used for interactive graphics for websites, as well as desktop presentations and games.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A game apparatus, comprising:
   a replaceable cartridge having a chamber having one dimension not greater than one centimeter, said chamber configured to contain a biologically active component, said chamber having at least one input port configured to allow a stimulus to be applied to said biologically active component, and at least one output port configured to provide a signal indicative of a response of said biologically active component;
   a stimulus controller in communication with said at least one input port of said chamber, said stimulus controller configured to accept an instruction from a user and in response to said instruction to provide said stimulus to said biologically active component;
   a response receiver in communication with said at least one output port of said chamber, said response receiver configured to accept said signal indicative of said response of said biologically active component and configured to generate at least one signal suitable for display to a user;
   a display in communication with said data receiver, said display configured to display to said user information indicative of said response of said biologically active component; and
   a computer-based game controller, said computer-based game controller comprising a set of pre-defined rules of play that define a game and that comprise pre-defined rules for determining a score for one or more players of said game.

2. The game apparatus of claim 1, wherein said chamber comprises a microfluidic chamber.

3. The game apparatus of claim 2, wherein said user is situated remotely from said microfluidic chamber.

4. The game apparatus of claim 1, wherein said biologically active component is a live single-celled organism.

5. The game apparatus of claim 1, wherein said biologically active component comprises dead tissue.

6. The game apparatus of claim 1, wherein said biologically active component is a protein.

7. The game apparatus of claim 1, wherein said biologically active component is an enzyme.

8. The game apparatus of claim 1, wherein said stimulus to be applied to said biologically active component is a chemical stimulus.

9. The game apparatus of claim 1, wherein said stimulus to be applied to said biologically active component is a mechanical stimulus.

10. The game apparatus of claim 1, wherein said stimulus to be applied to said biologically active component is a optical stimulus.

11. The game apparatus of claim 1, wherein said stimulus to be applied to said biologically active component is a thermal stimulus.

12. The game apparatus of claim 1, wherein said stimulus controller is configured to apply said stimulus to said biologically active component in accordance with pre-defined rules of a game.

13. The game apparatus of claim 1, wherein said response receiver is configured to analyze said signal indicative of said response of said biologically active component in accordance with said pre-defined rules of a game.

14. The game apparatus of claim 1, wherein said information indicative of said response of said biologically active component includes scoring information for a user.

15. The game apparatus of claim 1, wherein said set of pre-defined rules of play that define a game involve a first action to be performed by a first player of said game and a second action to be performed by a second player of said game.

16. The game apparatus of claim 1, wherein said pre-defined rules for determining a score for one or more players of said game include rules for providing a first score for a first player of said game and a second score for a second player of said game.

17. The game apparatus of claim 1, wherein said set of pre-defined rules of play that define a game include rules under which a first player of said game and a second player of said game can place bets on said game.

\* \* \* \* \*

SEQUENCE LISTING

<160> NUMBER OF SEQ ID NOS: 6

<210> SEQ ID NO 1
<211> LENGTH: 30
<212> TYPE: DNA

-continued

```
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
      primer pair that had a melting temperature between 57 and 58  C

<400> SEQUENCE: 1
cttttgttcc ctttagtgag ggttaattgc                                          30

<210> SEQ ID NO 2
<211> LENGTH: 25
<212> TYPE: DNA
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
      primer pair that had a melting temperature between 57 and 58  C

<400> SEQUENCE: 2
cgtatgttgt gtggaattgt gagcg                                               25

<210> SEQ ID NO 3
<211> LENGTH: 24
<212> TYPE: DNA
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
      primer pair that had a melting temperature between 57 and 58  C

<400> SEQUENCE: 3
ctgcattaat gaatcggcca acgc                                                24

<210> SEQ ID NO 4
<211> LENGTH: 24
<212> TYPE: DNA
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
      primer pair that had a melting temperature between 57 and 58  C

<400> SEQUENCE: 4
ccgtattacc gcctttgagt gagc                                                24

<210> SEQ ID NO 5
<211> LENGTH: 27
<212> TYPE: DNA
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
      primer pair that had a melting temperature between 57 and 58  C

<400> SEQUENCE: 5
gtaggtatct cagttcggtg taggtcg                                             27

<210> SEQ ID NO 6
<211> LENGTH: 28
<212> TYPE: DNA
<213> ORGANISM: Artificial Sequence
<220> FEATURE:
<223> OTHER INFORMATION: Artificial sequence designed using Genious
      4.7.4 (Biomatters). Inside a continuous part of the pCS2 region
      successive blocks of 200 bp were assayed for the best possible
```

```
                          -continued
      primer pair that had a melting temperature between 57 and 58  C

<400> SEQUENCE: 6
actcaagacg atagttaccg gataaggc                                       28
```